R. MASTERS.
FURNACE FOR ANNEALING METALS.
APPLICATION FILED AUG. 11, 1914.

1,241,750.

Patented Oct. 2, 1917.
7 SHEETS—SHEET 1.

R. MASTERS.
FURNACE FOR ANNEALING METALS.
APPLICATION FILED AUG. 11, 1914.
1,241,750.
Patented Oct. 2, 1917.
7 SHEETS—SHEET 3.
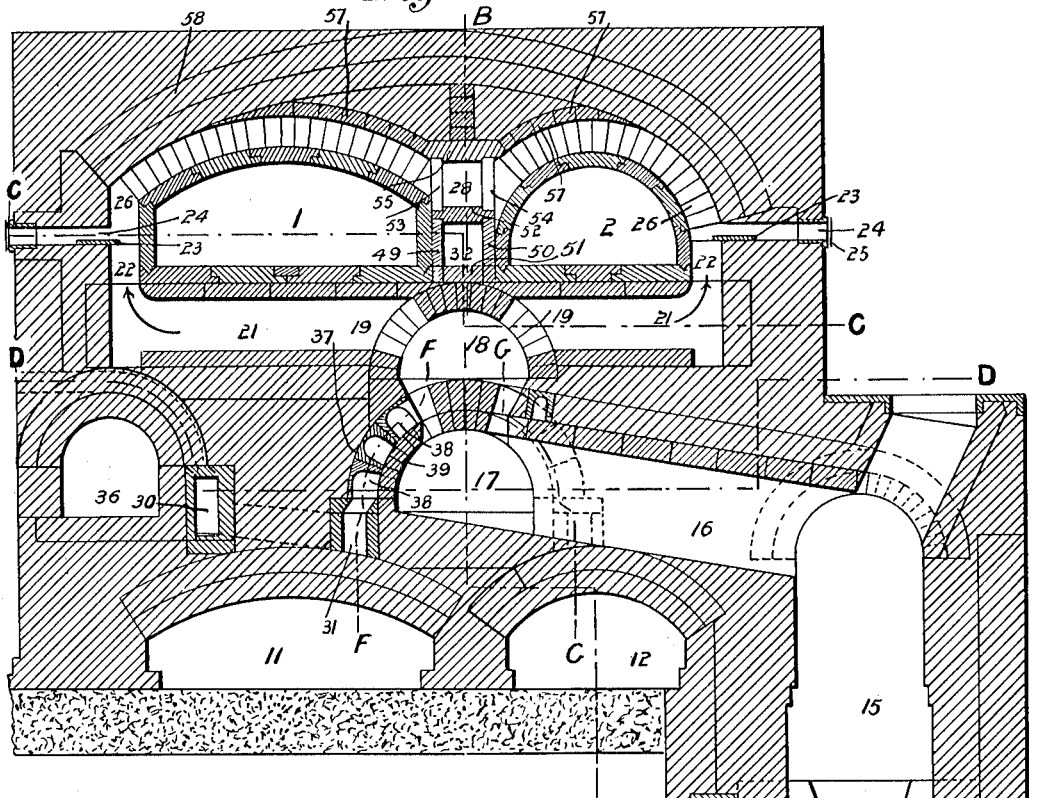
Fig. 3.
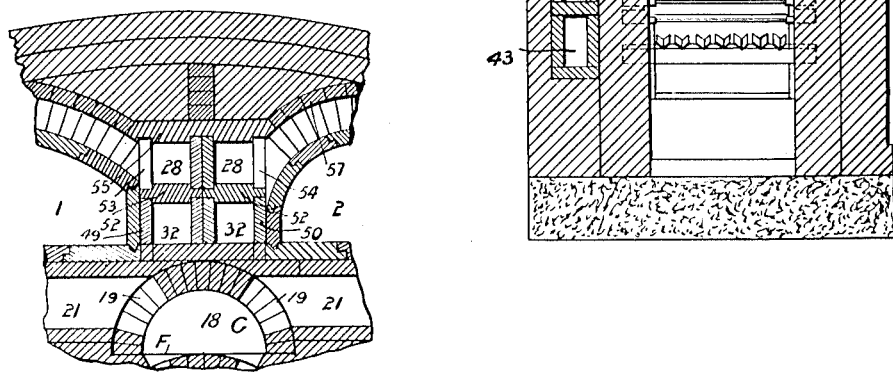
Fig 3.ª

R. MASTERS.
FURNACE FOR ANNEALING METALS.
APPLICATION FILED AUG. 11, 1914.

1,241,750.

Patented Oct. 2, 1917.
7 SHEETS—SHEET 5.

Witnesses

Inventor
Richard Masters

R. MASTERS.
FURNACE FOR ANNEALING METALS.
APPLICATION FILED AUG. 11, 1914.

1,241,750.

Patented Oct. 2, 1917.
7 SHEETS—SHEET 7.

UNITED STATES PATENT OFFICE.

RICHARD MASTERS, OF DUDLEY, ENGLAND.

FURNACE FOR ANNEALING METALS.

1,241,750.  Specification of Letters Patent.  Patented Oct. 2, 1917.

Application filed August 11, 1914. Serial No. 856,173.

*To all whom it may concern:*

Figure 1:
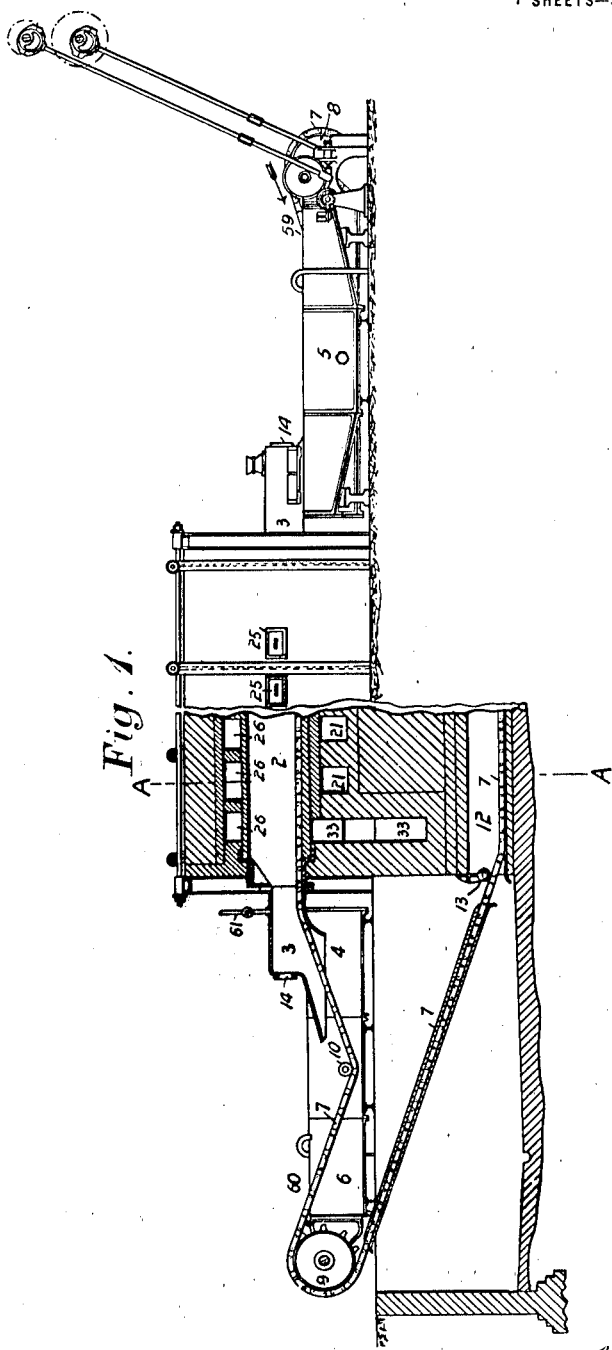
Figure 2:
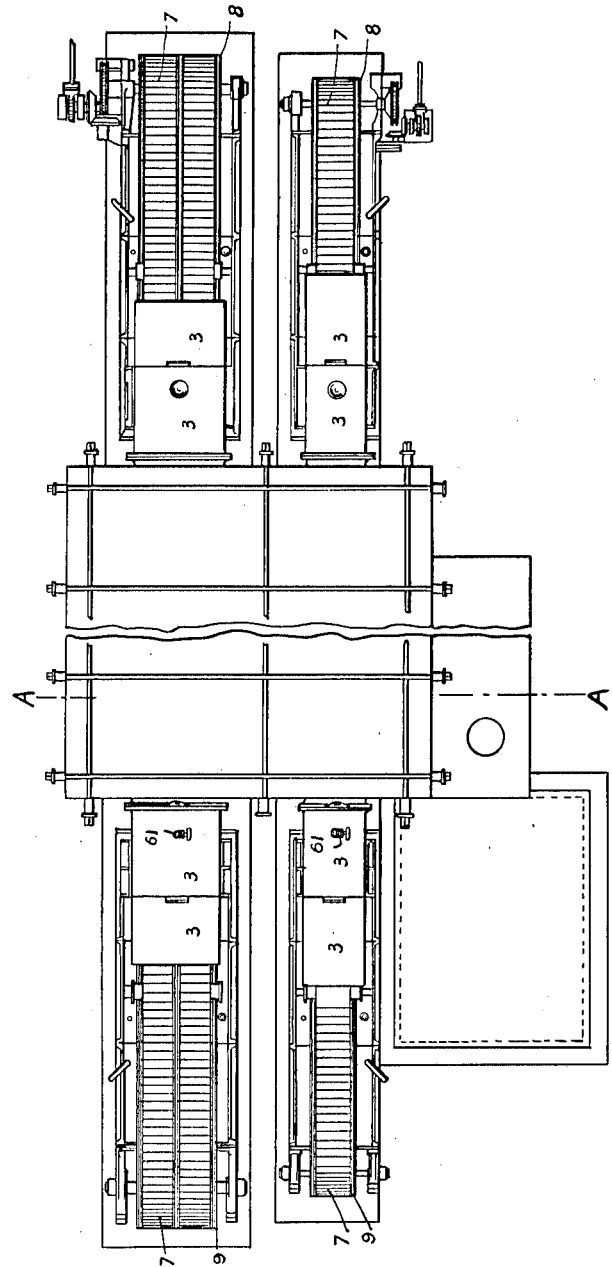
Figure 4:
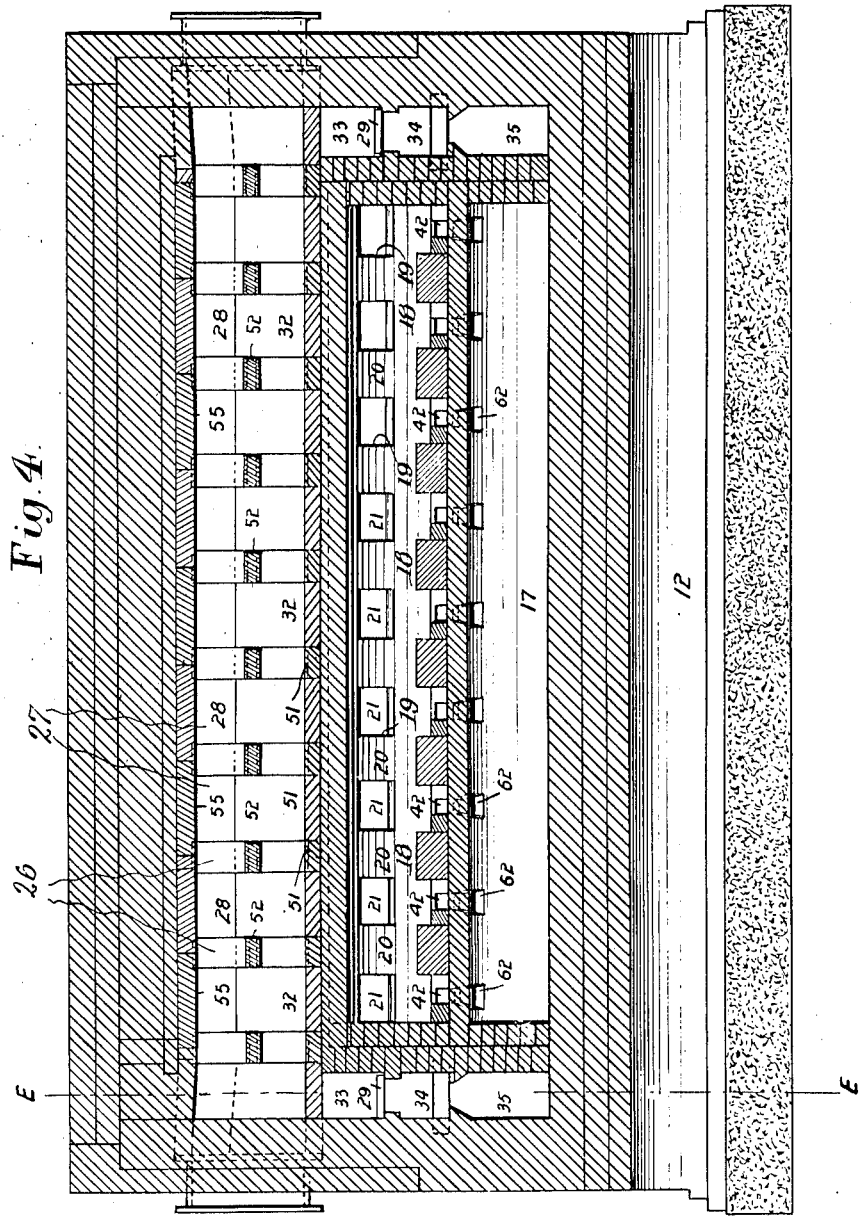
Figure 5:
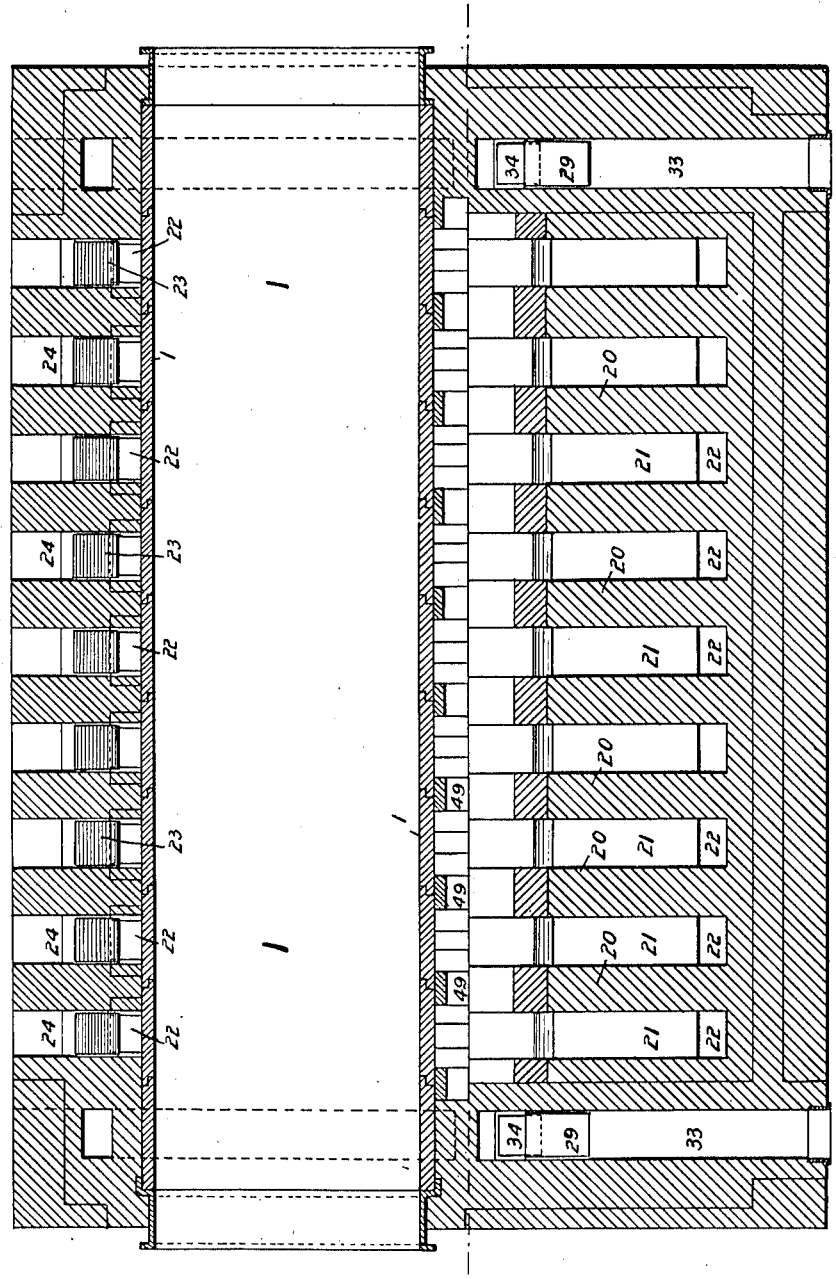
Figure 6:
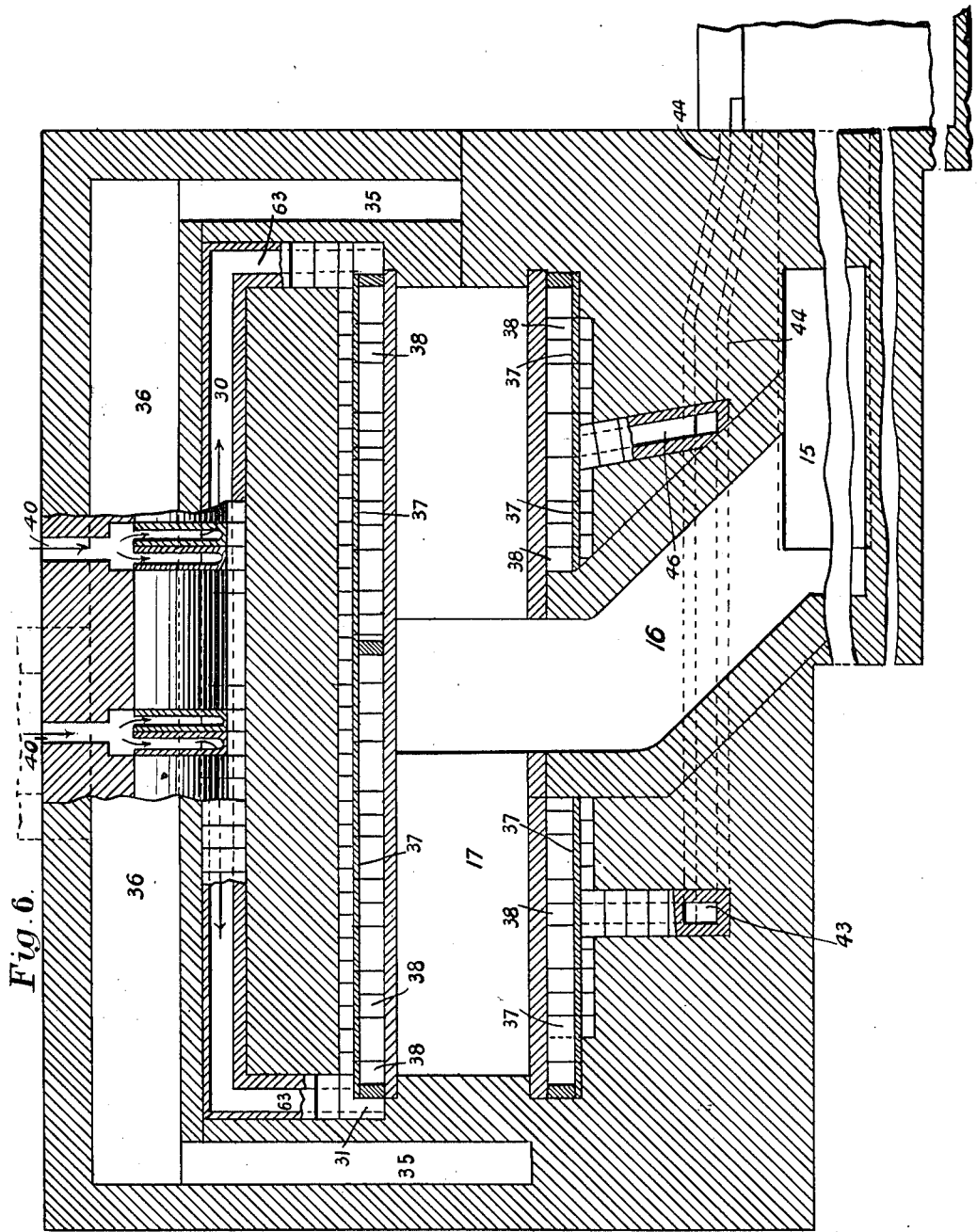
Figure 7:
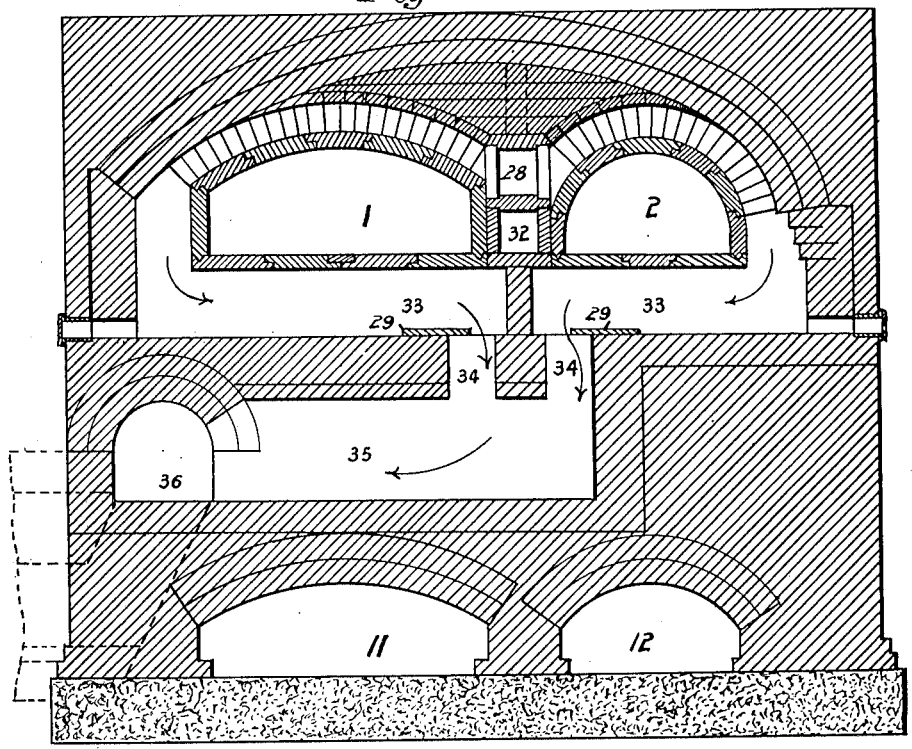
Figure 8:
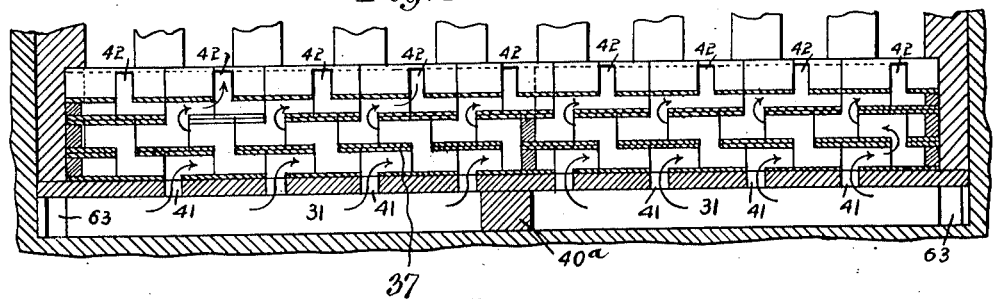
Figure 9:
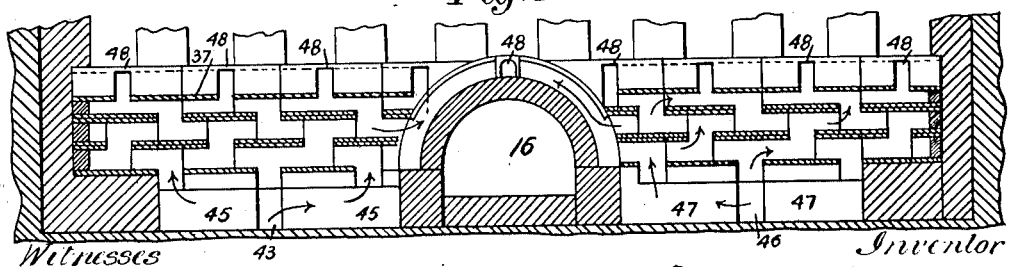

Be it known that I, RICHARD MASTERS, engineer, a subject of His Majesty the King of Great Britain and Ireland, residing at Gallant House, Dudley, in the county of Worcester, England, have invented certain new and useful Improvements in Furnaces for Annealing Metals, of which the following is a specification.
This invention has reference to furnaces for close annealing metals and particularly for close annealing copper and other metals in the form of wire rods, sheets, strips and the like, the said furnaces being of that type which have one or more retorts furnished with downwardly projecting inclined mouths at each end sealed by dipping into water contained in tanks, the articles to be annealed being passed through the water seals and the retorts by means of a continuous endless chain conveyer which travels upon rollers outside the furnace and back along the return tunnels in the bottom of the same.
The objects of this invention are to construct a fire-brick furnace in combination with a continuous conveyer which firstly shall effect in working a considerable economy in the fuel required for heating the metal.
Secondly to enable the heat of the retort or retorts to be regulated and controlled throughout the length as may be required to give the best results; thirdly to combine with the furnace the gas producer which is employed for heating retorts so that the whole of the furnace will be self-contained.
Other objects will appear from a perusal of the following specification and are specified in the claims appended thereto.
In the accompanying drawings,
Figure 1 is a part sectional side elevation of a two retort furnace constructed in accordance with this invention;
Fig. 2 is a plan of the same;
Fig. 3 is a cross sectional elevation of the same taken on line A A of Figs. 1 and 2 with the conveyer chain removed;
Fig. 3ª is an enlarged sectional view of a portion of the furnace, similar to Fig. 3, showing double longitudinal heat flues (both upper and lower) between the retorts.
Fig. 4 is a longitudinal sectional elevation taken on line B B of Fig. 3;
Fig. 5 is a sectional plan of part of the furnace taken on line C C of Fig. 3;

Fig. 6 is a sectional plan taken on line D D of Fig. 3;
Fig. 7 is a cross sectional elevation taken on line E E of Fig. 4;
Fig. 8 is a sectional side elevation of part of the furnace taken on line F F, of Fig. 3, and
Fig. 9 is a sectional side elevation taken on line G, G of Fig. 3.
The two retorts through which the goods are passed by the endless conveyer are respectively marked 1 and 2 and they are built and combined in the brick-work of the furnace as hereinafter described.
Each of these retorts has at each end a hood 3 which has an open mouth 4 dipping into a water seal tank the two tanks at the inlet end of the furnace being marked 5 and the two tanks at the outlet end of the furnace being marked 6. An endless chain conveyer 7 is provided for each retort and lying and passing along the bottom of the furnace and over sprocket drums 8 and 9 suitably mounted on bearings outside the water seal tanks, the endless chains 7 being constrained to dip down into the water seals by each passing under suitable idle rollers 10 therein and the return chain after leaving the end sprocket drum outside the water seal tank 6 passing back through the return tunnels 11 and 12 built in the basement of the furnace. Suitable idle rollers 13 are employed at the inlet and outlet ends of the furnace to guide the chain through the return tunnels.
The conveyer chain 7 is driven by suitable mechanism which slowly rotates the sprocket 8. The hoods 3 are furnished at their ends with sight holes 14 in a line with the axis of the retort so that the interior of the same can be seen from the outside, said sight holes also being furnished with a suitable cover or covers.
The furnace is heated with producer gas and in order to heat the retorts economically and enable the temperature to be regulated throughout the length of the retorts as may be required in the working of the furnace, gas and secondary air passages and combustion chamber and heat flues are constructed and combined as follows:—A gas producer 15 is provided which may be of any known construction and is preferably built in the brick-work of the furnace so as to make the furnace and gas producer self-contained.

It is to be understood however that if desired the gas producer can be separate from the furnace. The upper part of the gas producer is provided with a gas passage 16 which communicates with a main longitudinal gas tunnel 17 which extends for a considerable portion of the length of the furnace and is arranged underneath and midway between the two retorts 1, 2. The arched top of the main longitudinal gas tunnel 17 is constructed of hollow horse shoe bricks as hereinafter described so as to form passages for heating the secondary air. Above the arch of the main gas tunnel 17 and below the retorts I provide an arched longitudinal combustion chamber 18 made with closed ends and extending along the furnace to about the same length as the main longitudinal gas tunnel 17. The combustion arch 18 has alternate openings 19 and blank portions 20 along both sides, the openings 19 communicating with horizontal cross passages 21 immediately below the floors of the retorts 1, 2. These cross passages 21 can conveniently be nine inches wide with nine inch blank parts between each all along underneath each retort. The outer ends of these cross passages 21 extend upwardly at 22 at the sides of the retorts and at the top are controlled by sliding dampers 23 which can be moved and adjusted through openings 24 in the sides of the furnace such openings being closed by suitable doors 25. Beyond the dampers 23 the upwardly extending passages 22 communicate with arch gas passages 26 immediately over the tops of the retorts and between arched dividing walls 27 and these arched gas passages 26 communicate with an upper longitudinal heat flue 28 arranged between the two retorts 1, 2. This upper longitudinal heat flue 28 communicates with the lower longitudinal heat flue 32 along which the waste gases flow toward the ends of the furnace where they pass into cross passages 33 and then down through passages 34 regulated by dampers 29 to lower cross passages 35 leading to the main waste gas flue 36 which is arranged longitudinally in one side of the base of the setting and leads to the stack.

The arrangement for heating the secondary air is preferably as follows:—The outer ring of the arch of the main longitudinal gas tunnel 17 is formed with what are known as horse shoe bricks 37 as they have horse shoe shaped cavities 38 along and through which the secondary air flows outside the ring 39 of the arch of the gas tunnel 17. The secondary air for supplying what is the left hand side in Fig. 3 of this arch of the gas tunnel 17 is led from air inlet passages 40 in the left hand side of the setting, see Figs. 3 and 6, these passages being carried over the arch of the waste gas flue 36 which lead to a longitudinal flue 30 which communicates with end cross flues 38 which latter communicate with another longitudinal flue 31 at the bottom of the arch of horse shoe bricks 37 (see Fig. 8). This passage 31 is stopped at the center at 40$^a$ and in the top of it there are openings 41 up which the central air flows as indicated by the arrows in Fig. 8 and through the cavities 38 in the horse shoe bricks 37, the air passing up in zigzag form to the outlet nostrils 42 in the arch of the gas flue 17 at the bottom of the combustion chamber 18 where it meets the gases flowing up the outlets 62 from the gas tunnel 17. The secondary air to supply the other side that is the right hand side of the arch of the gas tunnel 17 is supplied from two longitudinal air passages 43, 44 at the side of the gas producer one of these air passages, namely that marked 43 being continued through the brick-work of the furnace and communicating with a bottom passage 45 below the horse shoe blocks on the left hand side of the producer arch (see Figs. 6 and 9) and the other secondary air inlet passage 44 communicating with the cross passage 46 which communicates with a lower passage 47 to supply air to the horse shoe bricks on the right hand side of the producer arch (see Figs. 6 and 9), said secondary air being heated by passing up through the horse shoe bricks as above described and passing out through the nostrils 42 in the gas arch at the bottom of the combustion chamber 18. The secondary air is regulated by the usual air slides at the air inlets. As the secondary air is raised to a high temperature thorough combustion takes place in the combustion chamber 18 and in the cross flues underneath the retorts 1 and 2 the heat passing up and around the retorts between the arched dividing walls 27 as aforesaid to the central longitudinal heat flues 28, 32 and from thence to the main waste gas flue 36 as aforesaid.

The side walls of the longitudinal heat flues 28, 32 between the retorts 1, 2 have to be constructed to withstand the thrust of the arches of the retorts and this is effected by building the side walls 49, 50 of these flues of slabs on edge with intermediate bricks 51 between the lower parts resting on the arch of the combustion chamber 18 the floor between the upper longitudinal heat flue 28 and the lower longitudinal heat flue 32 being formed with cross tiles 52 made with shouldered or rabbeted ends against the shoulders of which the side slabs 49, 50 fit. The walls of the upper longitudinal heat flue 28 are also formed of side slabs 53, 54 resting on the rabbeted ends of the cross tiles 52 against the shoulders thereof. The top ends of the side slabs 53, 54 are maintained at the proper distance apart by covering slabs 55 which are also rabbeted to form struts and withstand the thrust of the arches of the retorts and of the arched dividing walls 27 between the heat passages over the retorts. The heat passages between these arched dividing walls 27 are closed at the top by arched cross bricks 57 which abut on to the ends of the covering slabs 55 and these are covered by a continuous arch 58 which extends right over the two retorts 1, 2 from side to side (see Fig. 3).

It will be understood that the goods to be annealed are placed on the conveyer chains at the inlet end of the furnace, say at 59 in Fig. 1, and as the conveyer chain is slowly moved in the direction indicated by the arrow the goods are by the chain carried down into the water seal tank 5 and along and up through the bottom opening of the mouth 3 which dips into the water seal and so on into the retort, the goods moving slowly along the same and being heated to the required degree and ultimately passing out through the other mouth piece 4 at the outlet end of the retort and so on into the water seal tank 6 where the articles are cooled and then pass up out of the water to 60 Fig. 1 where the goods are removed from the conveyer chain properly annealed.

A proper supply of steam or vapor such as by the steam pipe 61 is provided to fill the retort and mouth pieces and drive out the air to prevent oxidation. The water level is maintained in the tanks by a suitable supply and overflow or by any suitable means.

When the furnace is furnished with a single retort then the construction above described is modified somewhat to suit as will readily be understood.

What I claim as my invention and desire to secure by Letters Patent is:—

1. An annealing furnace comprising an elongated retort, an elongated waste gas chamber at the side of the retort and co-extensive therewith, a waste gas flue below the retort and co-extensive therewith, downdraft flues near the ends of the retort connected terminally with the waste gas chamber and the waste gas flue respectively, a combustion chamber arranged immediately below the said waste gas chamber and co-extensive therewith, the retort being provided in its walls with circumferentially extending passages communicating terminally with the combustion chamber and waste gas chamber respectively and being separated by imperforate longitudinally spaced partitions, means for supplying combustible fluid to the combustion chamber, and independently operable means for controlling the flow of gas through the said passages of the retort.

2. An annealing furnace comprising an elongated retort, an elongated waste gas chamber at the side of the retort and co-extensive therewith, a waste gas flue below the retort and co-extensive therewith, downdraft flues near the ends of the retort connected terminally with the waste gas chamber and the waste gas flue respectively, a combustion chamber arranged immediately below said waste gas chamber and co-extensive therewith, the retort being provided in its walls with circumferentially extending passages communicating terminally with the combustion chamber and waste gas chamber respectively and being separated by imperforate longitudinally spaced partitions, independently operable means for controlling the flow of gas through the said passages of the retort, an arched gas flue disposed beneath the combustion chamber and having gas passages in its arched wall communicating with the latter, means for supplying hot producer gas to the said flue, the arched wall of the gas flue being provided further with tortuous air passages leading from the atmosphere to the combustion chamber to supply secondary air thereto.

3. An annealing furnace comprising a pair of elongated retorts disposed in parallel and spaced relation to each other horizontally, a waste gas chamber disposed between the retorts and co-extensive therewith, a waste gas flue below the retorts and co-extensive therewith, downdraft flues near the ends of the retorts connected terminally with the waste gas chamber and the waste gas flue respectively, a combustion chamber arranged immediately below the said waste gas chamber and co-extensive therewith, the retorts being provided in their walls with circumferentially extending passages communicating terminally with the combustion chamber and waste gas chamber respectively and being separated by imperforate longitudinally spaced partitions, means for supplying combustible fluid to the combustion chamber, and independently operable means for controlling the flow of gas through the said passages of the retort.

4. An annealing furnace comprising a pair of elongated retorts disposed in parallel and spaced relation to each other horizontally, a waste gas chamber disposed between the retorts and co-extensive therewith, a waste gas flue below the retorts and co-extensive therewith, down-draft flues near the ends of the retorts connected terminally with the waste gas chamber and the waste gas flue respectively, a combustion chamber arranged immediately below said waste gas chamber and co-extensive therewith, the retorts being provided in their walls with circumferentially extending passages communicating terminally with the combustion chamber and waste gas chamber respectively and being separated by imperforate longitudinally spaced partitions, independently operable means for controlling the flow of gas through the said passages of the retort, an arched gas flue disposed beneath the combustion chamber and having gas passages in its arched wall communicating with the latter, means for supplying hot producer gas to the said flue, the arched wall of the gas flue being provided further with tortuous air passages leading from the atmosphere to the combustion chamber to supply secondary air thereto.

In testimony whereof I affix my signature in presence of two witnesses.

RICHARD MASTERS.

Witnesses:
CHARLES BOSWORTH KETLEY,
ELIZABETH MAY DUDLEY.